United States Patent [19]

Silvestri

[11] 4,358,969

[45] Nov. 16, 1982

[54] HIGH PRESSURE AIR TURBINE AND GEAR TRAIN SYSTEM

[76] Inventor: Giovanni J. Silvestri, 4 Meadowbrook Dr., Barrington, R.I. 02806

[21] Appl. No.: 798,064

[22] Filed: May 18, 1977

[51] Int. Cl.³ ............................................. F16H 3/44
[52] U.S. Cl. ........................................ 74/785; 74/801
[58] Field of Search .................................. 74/785, 801

[56] References Cited

U.S. PATENT DOCUMENTS

| | | | |
|---|---|---|---|
| 1,281,785 | 10/1918 | Kellow | 74/801 |
| 1,434,620 | 11/1922 | McCain | 74/801 |
| 1,502,107 | 7/1924 | McCollum | 74/801 |
| 1,706,109 | 3/1929 | Dodge | 74/785 |
| 2,259,112 | 10/1941 | Lundquist | 74/801 |
| 2,498,295 | 2/1950 | Peterson et al. | 74/801 |
| 2,558,738 | 7/1951 | Davis, Jr. et al. | 74/785 |
| 2,700,311 | 1/1955 | Bade | 74/801 |
| 2,804,785 | 9/1957 | Mendez | 74/801 |
| 2,950,082 | 8/1960 | McVeigh | 415/212 |
| 3,292,459 | 12/1966 | Krzyszczuk | 74/785 |
| 3,521,505 | 7/1970 | Sebring | 74/785 |
| 3,728,913 | 4/1973 | Nagasaki | 74/785 |
| 4,043,226 | 8/1977 | Buuck | 74/785 |
| 4,075,910 | 2/1978 | Davis et al. | 74/785 |

FOREIGN PATENT DOCUMENTS

| | | | |
|---|---|---|---|
| 222173 | 1/1958 | Australia | 74/785 |
| 507773 | 11/1954 | Canada | 74/785 |
| 2110889 | 10/1971 | Fed. Rep. of Germany | 64/15 R |
| 2305780 | 8/1974 | Fed. Rep. of Germany | 74/785 |
| 1331018 | 5/1963 | France | 74/785 |
| 891041 | 3/1962 | United Kingdom | 74/785 |

*Primary Examiner*—Allan D. Hermann
*Attorney, Agent, or Firm*—Robert F. Beers; Arthur A. McGill

[57] ABSTRACT

A turbine-gear train system for driving an axial flow water pump which comprises a turbine assembly and a gear train assembly. Air at high pressure does work on the impulse turbine wheel. The torque so generated is transmitted to the sun gear assembly of a two-stage planetary reduction gear. The output torque is taken in the same direction of rotation as the input. The system is a low-noise, high-power, lightweight compact system and permits a reduction in the output power-to-weight ratio by a factor of five or more.

6 Claims, 2 Drawing Figures

HIGH PRESSURE AIR TURBINE AND GEAR TRAIN SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This patent application is co-pending with my eight other patent applications Ser. Nos. 798,058; 798,059; 798,060; 798,061; 798,062; 798,063; 798,065; 798,066 and having the same filing date of May 18, 1977; related to a high pressure air turbine-gear train system describing and claiming various aspects thereof.

This invention relates to a gear-train system and more particularly to a low-noise, high-power, lightweight and compact turbine-gear train system for driving an axial flow water pump for ejecting or launching torpedoes from submerged submarine tubes while generating the least amount of radiated noise, occupying the smallest volume and requiring the least maintenance.

During World War II, submarine fired torpedoes were primarily launched by blowing a charge of compressed air into the tube behind the weapon in the same way as one propels a pea from a peashooter. However, this generated a large air bubble in the water which not only made noise but visually identified the submarine firing position. Later on this adverse condition was circumvented and additional advantages realized by using a single piston, single stroke hydraulic pump to displace water which in turn displaced or launched the torpedo. Air was still used as the energy source, but only to drive the hydraulic piston which operated with ambient depth pressures on its inlet side. The air spent was discharged into the submarine and thereby no identifiable air bubble existed outside the submarine. Furthermore, the work required was lessened because the firing depth pressure was equalized on the fore and after ends of the firing tubes. However, the disadvantages of this system were that it was exceedingly noisy, required a lot of space for the mechanical hardware, and was very heavy thereby taxing the submarines useful load. Furthermore, the stresses in the structural systems were high. The noise generated of the system was further aggravated by the need to return the system to "battery" or initializing position.

Later on a system incorporating a turbine and a gear train to drive an axial flow pump, which pressurized the after end of the torpedo launched tube with seawater, was conceived and built to demonstrate the practicability of launching torpedoes using relatively lightweight systems. However, it did not include noise reduction considerations and did not satisfy the power requirements to meet the required ejection velocities which became higher because of increased submarine performance. Besides, the system was underpowered for the application, its planet carrier structure was torsionally flexible causing misalignments of planet gear axes relative to the sun and ring gear axes and resulting in adverse tooth loading and noise. In addition, the shaft stiffness between first and second stage gear clusters was not the same for all clusters causing an uneven distribution of load among the planet clusters which thereby aggravated the tooth stress. Furthermore, the ring gear design permitted distortions of pitch line under the influence of load and further contributed to uneven distribution and increased tooth stresses. Furthermore, the gear tooth size was too large to permit at least a two tooth contact ratio which thereby caused a less desirable load transfer transient at successive tooth engagements and contributed to noise. Besides, the relatively large teeth also limited the precision to which it could be manufactured which resulted in greater errors in action and larger dynamic loads. No attempt was made to reduce noise transmitted to support structures. It is thus desirable to have a turbine-gear train system which will be free of the above-identified defects.

SUMMARY OF THE INVENTION

The turbine-gear train assembly which is capable of operating with a low-noise at high-power and is of lightweight comprises a turbine assembly and a gear train assembly. Air at pressures up to 3,000 psi (pounds per square inch) drives the impulse turbine wheel and the torque generated by the lightweight turbine wheel is transmitted to the shaft via a steel drive dog. The shaft and wheel assembly is supported on antifriction bearings which are preloaded. The turbine output torque is transmitted via the shaft to the input sun gear assembly of a two-stage planetary reduction gear. The sun gear drives six identical planet clusters each of which has a first stage gear and a second stage pinion. This arrangement allows a set of three of the first stage gears of these planet clusters to engage with their corresponding pinions on one end of the sun gear and a second set of three of the first stage gears to engage with their corresponding pinions on the other end of the sun gear, thus arranging the six second stage pinions lie in a plane perpendicular to the center line of the arrangement and engage a ring gear. Both the sun gear and the ring gear have no supporting bearings and they are centered and supported radially by the planet cluster gears. The torque developed by the turbine is transmitted via the centrally located spline on the sun gear to the first stage planet gear, down its shaft to an electron beam welded joint to an area along the hub of the second stage planet pinion to the ring gear. The ring gear torque is transmitted through the rubber in shear to the torque transfer segment of the assembly which ultimately reacts to the ground via the gear case. Reaction forces between the gear teeth cause torque and motion of the planet carrier and the output torque is taken in the same direction of rotation as the input torque from the spline shaft. The entire gear case assembly is bolted together with eight bolts which serve also to attach the vibration mount which ultimately refer the gear case torque to the support structure.

An object of subject invention is to have a two-stage epicyclic gear train having at least two tooth contact ratio at each stage.

Another object of subject invention is to have a two-stage epicyclic gear train having a total of six drive meshes in each stage.

Still another object of subject invention is to have a two-stage epicyclic gear train having a plurality of techniques for adjusting gear teeth in all clusters to precise timing for uniform load sharing.

Still another object of subject invention is to have a two-stage epicyclic gear train having torsional capacitance between each stage to minimize the dynamic loads.

Still another object of subject invention is to have a two-stage epicyclic gear train system having capability of preloading bearings in a uniform manner to insure for uniform load distribution on conical roller bearings and a means for controlling the exact amount of the preload applied.

Still another object of subject invention is to have two-stage epicyclic gear train system having the provision for the attenuation of vibratory energy between the ring gear and the supporting structure.

Still another object of subject invention is to have a gear train system having small size and low weight so as to improve its maneuverability aboard a vehicle such as a submarine.

Another object of subject invention is to have a two-stage epicyclic gear train system having a torsionally and laterally stiff planet carrier structure to insure that the axes of all gears remain parallel under the influence of heavy torque loads.

Still another object of subject invention is to have a gear train system having a minimum weight structure to minimize the dynamic loading.

Still another object of subject invention is to have a two-stage epicyclic gear train system which has the use of zero maintenance.

Other objects, advantages and novel features of this invention will become apparent from the following detailed description of the invention when considered in conjunction with the accompanying drawings wherein:

DESCRIPTION OF A PREFERRED EMBODIMENT

Figure 1:
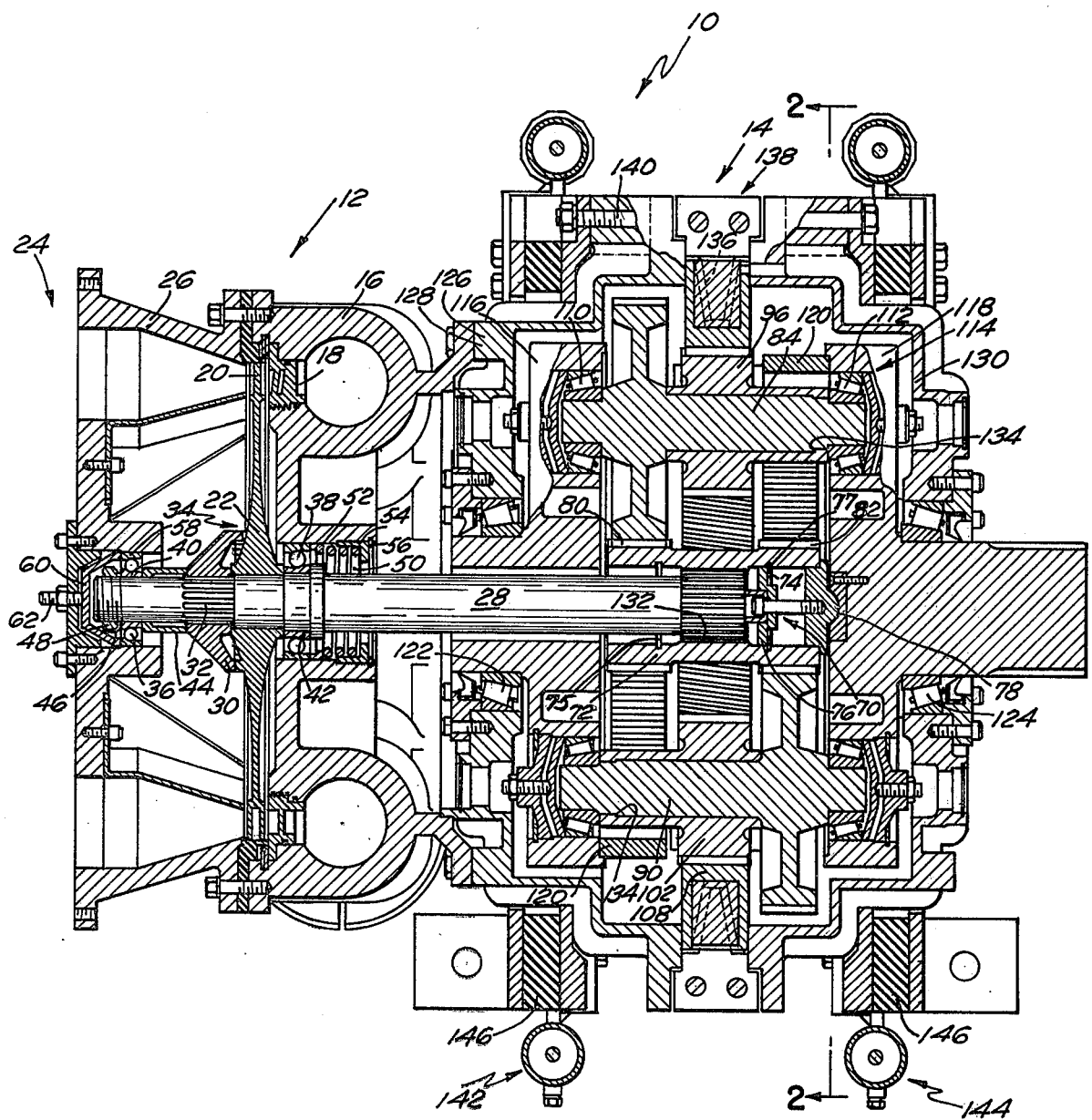
FIG. 1 is a multi-cross sectional view of a high pressure air turbine-gear train system built according to the teachings of subject invention.
Figure 2:
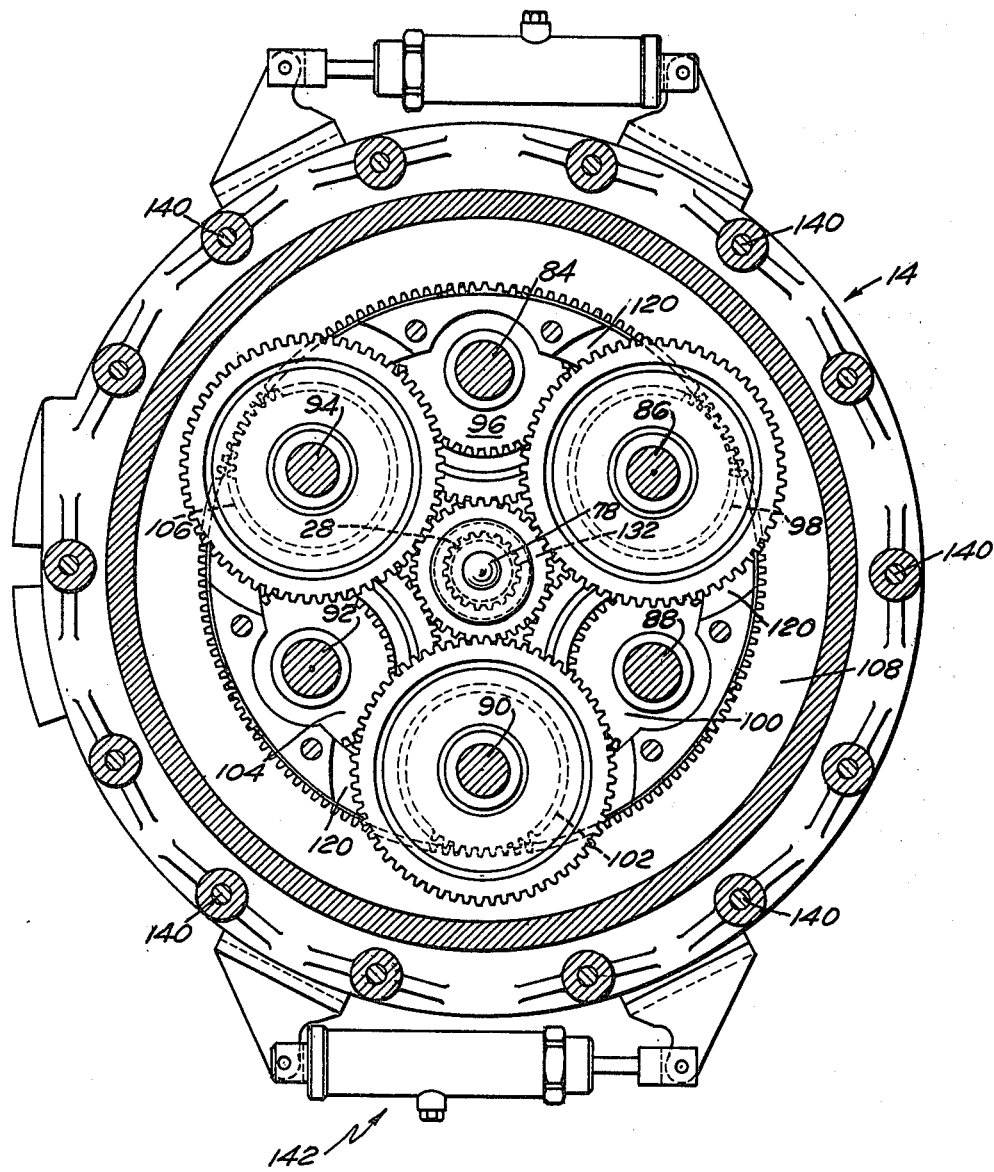
FIG. 2 is a cross section of FIG. 1 taken along line 2—2 of FIG. 1.

Referring to the drawings wherein like reference characters designate like parts throughout the several views, and more particularly to FIG. 1 thereof, a multi-cross sectional view of a high pressure air turbine-gear train assembly is shown. Turbine-gear train assembly 10 comprises a turbine assembly 12 and a gear train assembly 14. Air at high pressures up to 3,000 psi (pounds per square inch) and room temperature is delivered from an externally controlled valve to the nozzle manifold 16 and through the nozzle 18 where the air expands and thus increases its velocity. The momentum of the gas is decreased as it passes through and does work on the blades 20 of the impulse turbine wheel 22, turning it in a counterclockwise direction looking at it from the left end 24 of FIG. 1 and is then exhausted through the exhaust manifold. The torque generated by the lightweight turbine wheel 22 is transmitted to shaft 28 via a steel drive dog 30. Drive dog 30 serves to take torque from wheel 22 at a radius where the forces are commensurate with the strength of the material of the wheel and transfers it to steel spline 32 on shaft 28. This aspect is shown in one of my co-pending patent applications Ser. No. 798,063 and filing date May 18, 1977; in a greater detail.

The shaft and wheel assembly 34 is supported on antifriction bearings 36 and 38 which have their respective inner races 40 and 42 locked to shaft 28 and spaced by wheel 22, drive dog 30, sleeve 44, lock washer 46, lock nut 48. The bearings are preloaded by spring 50 and spacers 52 and 54 against snap ring 56. The clearance between spacers 52 and 54 for accommodating thermally caused expansion and positioning of outer race 58 of bearing 36 is accomplished by flange 60. Flange 60 is positioned by a spherical end of screw 62 which allows the preload to be equally applied to the periphery of the bearing race and thus insures equal distribution of load on the balls of bearing 36 without the necessity of squareness control in manufacture. This is more fully described in one of my other co-pending patent applications having Ser. No. 798,059 and filing date May 18, 1977.

The turbine output torque is transmitted via shaft 28 as pointed out above to the input sun gear assembly 70 of preferably 7.93 to 1 two-stage planetary reduction gear. The sun gear assembly is made of sun gear 72 and elements 74, 76 and 78 as shown in FIG. 1. These elements together serve to limit the axial excursion of sun gear 72. Spur gear teeth 80 and 82 are provided on both ends of sun gear 72 and the gear blank is machined symmetrically to insure uniform deflections of the teeth on each end. The teeth are preferably defined as 20 degree pressure angle teeth but machined to operate at reduced center distance so that the operating pressure angle is approximately 15 degrees and the resulting tooth contact ratio is greater than 2. This reduces the gear noise by changing the transient of load transfer from tooth to tooth in operation. The sun gear 72 drives six identical planet clusters 84, 86, 88, 90, 92 and 94. This arrangement allows for the two sets of three each of the first stage gears of these clusters to engage with the pinions 80 and 82 on each end of the sun gear 72 so that the six second stage pinions 96, 98, 100, 102, 104 and 106 lie in a plane perpendicular to the center line of the arrangement and engage the ring gear 108. Both the sun gear 72 and ring gear 108 are centered and supported radially by the planet cluster gears 84, 86, 88, 90, 92 and 94, and 96, 98, 100, 102, 104 and 106. Assembly 70 has two symmetrical grooves 75 and 77 which enable it to be rotated so as to wear its teeth evenly and thereby increase its life. This concept of symmetry applies to the planet cluster arrangement as well so as to prolong the life of the system.

The planet gear clusters 84, 86, 88, 90, 92 and 94 are supported on tapered roller bearings 110 and 112 which in turn are supported by the planet carrier assembly 114 including support structure items 116, 118 and 120. This is shown in more detail and claimed in another of my co-pending patent applications having Ser. No. 798,066 and filing date May 18, 1977. Planet carrier assembly 114 including all gears is supported by tapered roller bearings 122 and 124 by the gear casing assembly 126 including fore part items 128 and aft part 130. The torque developed by the turbine is transmitted via the centrally located spline 132 on sun gear 72 to the first stage planet gear 84 down its shaft to an electron beam welded joint at area indicated by 134, then via the hub of the second stage planet pinion 96 to the ring gear 108. A method of alignment of gear teeth is described in detail and claimed in another of my co-pending patent applications having Ser. No. 798,061 and filing date May 18, 1977. The ring gear torque is transmitted through rubber in shear 136 to the torque transfer assembly 138 which ultimately reacts to ground via the gear case. This is discussed in more detail and claimed in another of my co-pending patent applications having Ser. No. 798,065 and filing date May 18, 1977. The reaction forces between the gear teeth cause torque and motion to be applied to the planet carrier 114, and the output torque is taken from its splined end in the same direction of rotation as the input.

The entire gear case assembly 126 is bolted together with bolts such as bolt 140 which also serve to attach the vibration mounts 142 and 144 which ultimately refer the gear case torque to the support structure by rubber in shear 146. The mounts are described in more detail and claimed in another of my copending patent applications having Ser. No. 798,058 and filing date May 18, 1977.

In operation, air at high pressures from an externally controlled valve is delivered to the nozzle manifold which expands through the nozzles which increase its velocity. The momentum of the gas is decreased as it passes through and does work on the blades of the impulse turbine wheel 22 turning it in a counterclockwise direction looking at it from the left end of the assembly and the air is then exhausted through the exhaust manifold 26. The torque generated by the lightweight turbine wheel 22 is transmitted to the shaft 28 by a steel drive 30 which takes the torque from the wheel at a radius where the forces are commensurate with the strength of the wheel material and transfers it to the steel spline 32 on the shaft 28. The shaft and the turbine output torque is then transmitted to the input sun gear assembly 70 of a two-stage planetary reduction gear train. Sun gear 72 drives 6 identical planet clusters and the arrangement allows for three of the first stage gears of these clusters to engage with the pinion on each end of the sun gear so that six second stage pinions lie in a plane perpendicular to the center line of the system and engage a ring gear which is referenced to ground. The output of the gear assembly is then transferred to the output shaft.

Briefly stated, an air turbine-gear train assembly built according to the teachings of subject invention and which is capable of operating with low-noise, at high-power and is of lightweight material comprising an air turbine assembly and a gear train assembly. Turbine wheel which is a component of the air turbine assembly is imparted rotational motion by air at high pressures delivered from a source and a control valve external to the machine. The rotational motion of turbine wheel is transferred to an input shaft by means of a drive dog. The torque thus produced is transferred from the shaft by means of a centrally located spline to a sun gear which in turn transmits it to the first stage planet gear. The torque is then transferred through the first stage gear shaft to the hub of the second stage planet pinion to the ring gear. The ring gear torque is transmitted through a rubber in shear to the torque transfer segment assembly which ultimately reacts to ground via the gear case. The reaction torque between the second stage pinion and the ring gear is transferred to the output shaft via the cluster bearings and the planet carrier.

Obviously, many modifications and variations of the present invention are possible in the light of the above teachings. As an example, the materials used in the fabrication of different components of the system can be varied without any deviation from the teachings of subject invention. Furthermore, pressure of the air used for rotational motion of the turbine wheel can be substituted by some other energy source. Besides, the ratio in the gear train assembly can also be varied. It is therefore understood that within the scope of the appended claims the invention may be practiced otherwise than specifically described.

I claim:

1. An air turbine and gear train system comprising:
   a turbine assembly, adapted to receive relatively high pressure air, for converting said relatively high pressure air to relatively high speed rotary shaft motion output;
   a gear train assembly, for receiving said relatively high speed rotary shaft motion output from said turbine assembly and reducing said relatively high speed rotary shaft motion to relatively low speed, high power rotary motion as the output thereof; and
   interconnecting means for connecting said turbine assembly and said gear train assembly;
   a relatively stationary housing;
   an input shaft, rotatably mounted within said relatively stationary housing;
   a first plurality of preloaded anti-friction roller bearings supported said input shaft;
   a turbine wheel, centrally mounted on said input shaft whereby said relatively high pressure air imparts motion to said turbine wheel thereby producing torque; and
   means for transferring said torque from said turbine wheel to said input shaft.

2. An air turbine and gear train system according to claim 1 wherein said interconnecting means further comprises:
   fastener means for connecting said relatively stationary housing to said gear casing assembly; and
   spline means whereby said input shaft drives said input sun gear.

3. An air turbine and gear train system according to claim 2 wherein said means for transferring said torque from said turbine wheel to said input shaft includes a drive dog attached to said input shaft, with a plurality of teeth for engagement with a spline in said turbine wheel hub.

4. An air turbine and gear train system according to claim 3 wherein said ring gear mounting is such that torque from said gear train assembly is referenced to ground by rubber in shear.

5. An air turbine and gear train system according to claim 4 wherein:
   said first plurality of planet gear clusters includes three clusters; and
   said second plurality of planet gear clusters includes three clusters.

6. An air turbine and gear train system according to claim 5 wherein all gear tooth contact ratios exceed two.

* * * * *